United States Patent
Arnold et al.

(10) Patent No.: US 7,427,359 B2
(45) Date of Patent: Sep. 23, 2008

(54) SELF-FILLING WET ELECTROCHEMICAL CELLS BY LASER PROCESSING

(75) Inventors: Craig B. Arnold, Alexandria, VA (US); Alberto Pique, Crofton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 880 days.

(21) Appl. No.: 10/868,447

(22) Filed: Jun. 9, 2004

(65) Prior Publication Data
US 2004/0256359 A1    Dec. 23, 2004

Related U.S. Application Data

(60) Provisional application No. 60/478,470, filed on Jun. 11, 2003.

(51) Int. Cl.
*B23K 26/00* (2006.01)
*B81C 1/00* (2006.01)

(52) U.S. Cl. .............. 216/6; 216/39; 216/80; 216/97; 219/121.69; 29/623.1; 29/623.5

(58) Field of Classification Search ........... None
See application file for complete search history.

(56) References Cited

U.S. PATENT DOCUMENTS

| 5,851,506 | A | 12/1998 | Zheng et al. |
| 5,875,092 | A | 2/1999 | Jow et al. |
| 6,045,942 | A | 4/2000 | Miekka et al. |
| 6,097,588 | A * | 8/2000 | Zheng et al. ............ 361/503 |
| 6,177,151 | B1 | 1/2001 | Chrisey et al. |
| 6,488,721 | B1 | 12/2002 | Carlson |
| 6,501,640 | B1 | 12/2002 | Niiori et al. |
| 6,521,110 | B1 | 2/2003 | Hodges et al. |
| 6,986,199 | B2 * | 1/2006 | Arnold et al. ............ 29/832 |

OTHER PUBLICATIONS

Arnold, C.B. et al "Laser transferred hydrous ruthenium oxide electrdes for micro-ultracapacitors" Proceedings—Electrochemical Society 2002-25 (Micropower and Microdevices) 52-60, 2002, no month available.*

C.B. Arnold et al, "Direct-write Planar Microultracapacitors by Laser Engineering", Journal of the Electrochemical Society, 150 (5) A571-A575 (2003), Mar. 2003.

CB Arnold et al "Laser transferred hydrous ruthenium oxide electrodes for micro-ultracapacitors" Micropower and Microdevices, Electrochemical Society, PV2002-25, 52-60, 2002, no month available.

(Continued)

*Primary Examiner*—Anita K Alanko
(74) *Attorney, Agent, or Firm*—John J Karasek; Stephen T Hunnius; Amy Ressing

(57) ABSTRACT

A method of preparing high capacity hydrous ruthenium oxide micro-ultracapacitors. A laser direct-write process deposits a film of hydrous ruthenium oxide in sulfuric acid under ambient temperature and atmospheric conditions. A dual laser process combining infrared and ultraviolet light is used for fabricating a complete wet electrochemical cell in a single processing step. Ultraviolet laser micromachining is used to tailor the shape and size of the deposited material into planar electrodes. The micro-ultracapacitors have improved size, weight, and cost efficiency and exhibit high specific power and high specific energy.

24 Claims, 2 Drawing Sheets

OTHER PUBLICATIONS

CB Arnold, et al, Direct writing of planar ultracapacitors by laser forward transfer processing, Photon Processing in Microelectronic & Photonics, SPIE, 4637, 353-360, 2002, no month available.

Arnold, et al, Laser Direct Writing of Hydrous Ruthenium Dioxide Micro-pseudocapacitors, Electroactive Polymers & Rapid Prototyping; Mat. Res Soc Procs, 698, 275-280, 2002, no month available.

* cited by examiner

SELF-FILLING WET ELECTROCHEMICAL CELLS BY LASER PROCESSING

This application claims priority from Provisional Application No. 60/478,470, filed Jun. 11, 2003. Provisional Application No. 60/478,470 is hereby incorporated by reference.

BACKGROUND OF THE INVENTION

1. Field of the Invention

The present invention relates to electrochemical cells and more particularly, to an improved electrochemical cell formed by a dual laser process and having a high output and low weight.

2. Description of the Related Art

High capacitance electrochemical capacitors (ultracapacitors, supercapacitors, pseudocapacitors) have been studied for more than 40 years, yet it has only been in the last decade that they have gained widespread attention. The interest in these systems has arisen mainly from commercial applications, such as electric or hybrid powered vehicles or power backup sources, where there is a need for energy storage systems that can hold relatively large amounts of energy yet deliver it in short pulses leading to high power output. Conventional parallel plate capacitors can deliver high power, but are limited in the amount of energy they can store. Electrochemical capacitors provide an intermediate range of power and energy between parallel plate capacitors and conventional batteries.

The need for high power pulsed energy sources is also important in the development of micro-power sources for microelectronic and microelectronic mechanical systems (MEMS). For example, a microdevice may need a burst of energy for locomotion or transmission of data. Although the maximum power requirements for pulsed operations are typically much less than one watt per square centimeter, this low output power is still more than can be delivered by a thin-film microbattery. Therefore, the development of hybrid micro-power systems that incorporate a high power supercapacitor in combination with a microbattery is essential for the future of next generation micro-devices.

The structure of an electrochemical capacitor is composed of two electrically conducting plates separated by an electrolyte. This can be arranged in either a stacked or planar structure. The planar structure is particularly useful for small (~mm-μm) sized supercapacitors where the device is located on a flat substrate such as a microchip.

The materials that compose the electrodes of supercapacitors are typically high surface area and porous carbon or other complex metal oxide systems such as ruthenium oxide or tantalum oxide. The particular mechanism for charge storage depends on the electrode materials, however, in all cases, a high surface area is a desirable attribute and must be maintained by the processing of the device. Furthermore, for the complex metal oxides, the amount of structural water in the system plays an important role in the ability to store and transport charge.

The manufacture of thin-film metal oxide supercapacitors is difficult due to the complex materials requirements for an effective, high capacitance power source. Aspects of morphological constraints and processing temperature limitations, in addition to the presence of water in the oxide structure have made metal oxide systems incompatible with prior art vacuum techniques for thin film growth such as physical vapor deposition.

Most prior art efforts to deposit supercapacitor electrode materials have resulted in ineffective or low capacitance power sources. However, the present invention incorporates a laser direct-write process to produce a high output cell. The method allows for depositing a material onto a receiving substrate by using a source of pulsed laser energy, a receiving substrate and a target substrate. The present invention incorporates this with a dual laser method for simultaneous or sequential deposition and processing the materials into electrochemical cells.

The target substrate comprises a laser transparent support having a back surface and a front surface. The front surface has a coating that comprises a mixture of the transfer material to be deposited and a liquid material. The source of pulsed laser energy can be positioned in relation to the target substrate so that pulsed laser energy can be directed through the back surface of the target substrate and through the laser-transparent support to strike the coating at a defined location with sufficient energy to volatilize material at the location, causing the coating to desorb from the location and be lifted from the surface of the support. The receiving substrate can be positioned in a spaced relation to the target substrate so that the transfer material in the desorbed coating can be deposited at a defined location on the receiving substrate and so that the material, or decomposition products thereof, in the desorbed coating can migrate from the space between the receiving substrate and the target substrate.

This laser direct-write process allows for depositing a wide range of materials such as complex polymeric materials or complex electronic materials, with no damage to the starting material, as well as the deposition can be carried out in ambient conditions, in a computer-controlled fashion and wherein the spatial resolution of the deposited material can be as small as 1 μm.

However, this prior art technique does not allow for the simultaneous creation of a capacitor. In other words, this laser direct-write process allows for the deposition of electrode material, but the electrolyte would then need to be added externally. In other words, the electrolyte would not be added during processing. The extra steps of adding the electrolyte after the creation of the electrodes creates additional problems. First, the external addition of the electrolyte provides little control over the amount of electrolyte actually added. Second, the addition of electrolyte causes device failure as the flow of liquid material can erode the electrodes. Third, the addition of excess liquid electrolyte is unavoidable at such small dimensions and leads to packaging and encapsulation difficulties. Fourth, the laser direct-write technique deposits 'wet' materials that need to be dried prior to laser machining. This adds additional processing steps and may damage the electrode material.

SUMMARY OF THE INVENTION

In accordance with the invention, a method is provided wherein the electrode material deposited on a substrate by laser direct-write or ink jet or screen printing or other means is converted into a working device that does not require additional processing steps.

More specifically, a dual-laser processing technique converts the electrode material into an electrochemical cell or capacitor. Converting the electrode material directly into a working device is important because the elimination of extra processing steps creates a smaller, more powerful, and more cost-effective device.

The electrode material of the present invention basically comprises a metal oxide and an electrolyte mixed together. As discussed below, the electrode material is then exposed to two lasers. Typically one laser is IR and one laser is UV, however, other wavelengths may be used. This exposure creates a gap in the electrode material which is then backfilled with the electrolyte material. This is important because it allows for a smaller and high output device.

Thus, according to the invention, a method of producing supercapacitors is provided which has fewer processing steps and wherein the supercapacitor is of smaller size and less mass. The method comprises: providing a substrate, depositing a film on the substrate, wherein the film is comprised of hydrous ruthenium oxide and sulfuric acid, exposing a portion of the film to an IR laser to form a first exposed portion, and exposing this first exposed portion to an UV laser. A further step for a manufactured device can be the encapsulation of the entire system.

In one preferred embodiment, the film deposited is ruthenium oxide mixed with sulfuric acid.

Preferably, the IR laser makes a single pass over the deposited film. Also, preferably the UV laser makes a minimum number of passes to remove the ruthenium oxide.

Preferably, the film deposited has a thickness of about 20 µm.

In one preferred embodiment, the ruthenium oxide is combined with about 5 M sulfuric acid.

Advantageously, the laser-machined groove separating the electrodes is about 25 µm.

In one preferred embodiment, the IR has a wavelength of about 1064 nm and the UV has a wavelength of about 355 nm.

Further features and advantages of the present invention will be set forth in, or apparent from, the detailed description of preferred embodiments thereof which follows.

DESCRIPTION OF THE PREFERRED EMBODIMENTS

Figure 1:
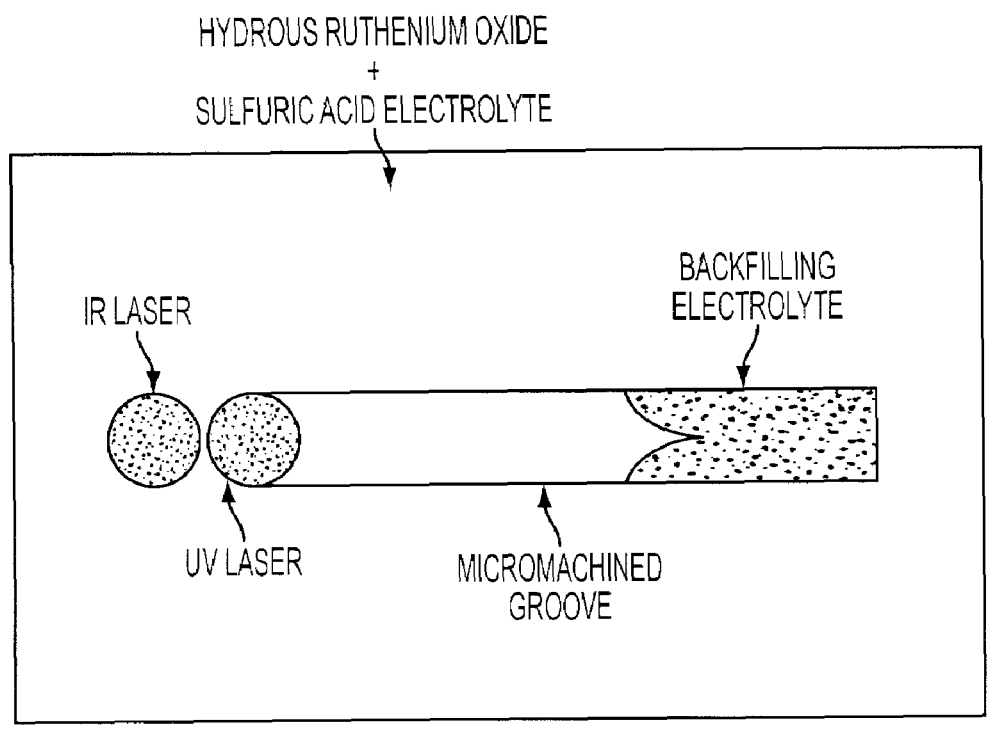
FIG. 1 provides a sketch of the self-filling process in a single component material to produce symmetric electrochemical cell (anode and cathode of same material). The dot represents the incident laser beams while the backfilling of the electrolyte into the laser micromachined groove is also represented.
Figure 2:
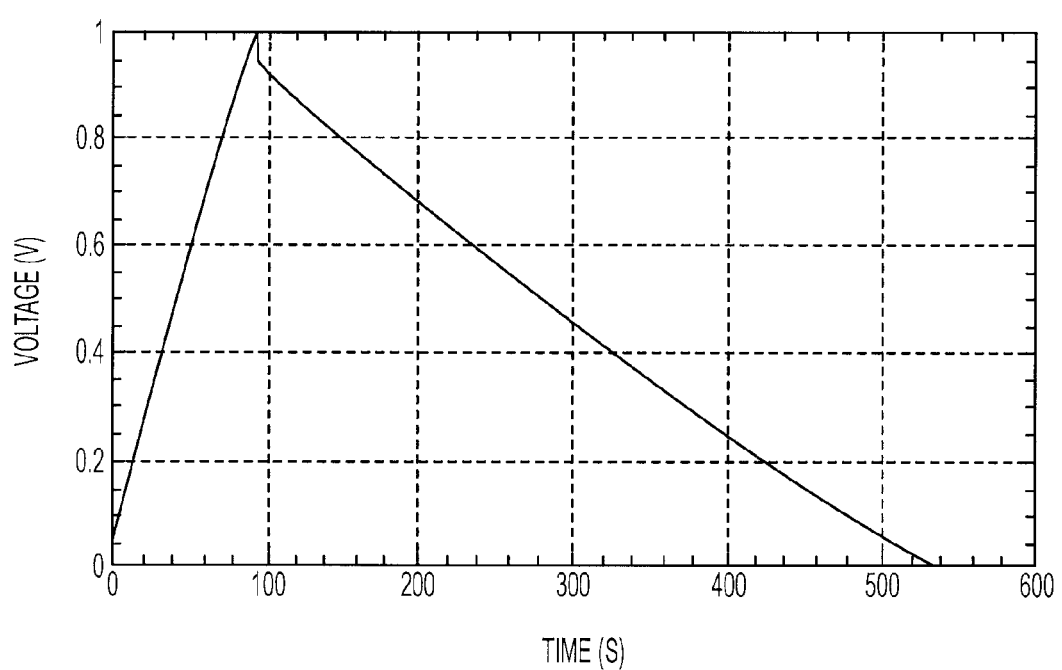
FIG. 2 provides a graph of charge and discharge data for a model of self-filled hydrous ruthenium oxide micro-ultracapacitor. Charging was at 50 µA and discharging was at 10 µA. The graph illustrates the linear charge and discharge behavior.

As indicated above, the supercapacitors of the invention are made in an efficient laser-based process that requires only a few steps. Additionally, the supercapacitors are smaller and lighter, yet maintain high power capabilities. More particularly, the electrolyte is included from the beginning of the process of making the capacitor. This eliminates the extra steps of any later additions of the electrolyte. Furthermore, this eliminates errors inherent in later additions of electrolytes and allows for a smaller, cleaner device.

As was also discussed, the capacitor is developed essentially from a substrate, a film containing the electrode material and the electrolyte material, then laser processing to create the electrode and electrolyte structure.

In one important example mentioned previously, the film deposited is ruthenium oxide mixed with sulfuric acid. Where exposed to the IR laser and the UV laser, the ruthenium oxide is removed from the film. This creates a gap in the electrode material, thus forming the electrodes. A short time after exposure, the gap is filled in by the sulfuric acid, thus forming the electrolyte and properly placed between the small gap of the electrodes. The laser allows for a very small and precise gap. The structure of the electrochemical capacitor is composed of two electrically conducting plates separated by an electrolyte.

The materials that compose the electrodes of supercapacitors are typically high surface area and porous carbon or other complex metal oxide systems. The film is usually an oxide which is mixed with a compatible electrolyte material. In one important embodiment the ruthenium oxide is mixed with about 5 M sulfuric acid in a ratio of about 1.5 grams/ml sulfuric acid. The thickness of the film on the substrate is usually about 10 µm thick. As previously mentioned, the substrate typically has a machined 25 µm groove.

In one preferred embodiment, the electrodes can be formed from a system of tantalum oxide. The concentration of tantalum oxide and sulfuric acid is similar.

The film is usually a material that can be applied to a substrate using a laser direct-write process or ink jet or screen printing or an other compatible process. The substrate can be prepared by solvent cleaning a two-inch quartz wafer, thermally depositing a thin (about 2-5 nm) metallic adhesion layer on the quartz, thermally depositing a gold layer (about 100-500 nm) on top, and, using a dicing saw, cut the two-inch wafer into 1 cm squares. Other insulating substrate materials such as glass or alumina can also be used to make self-filling wet electrochemical cells by this method.

The lasers wavelengths varies depending upon the film. In the preferred embodiment, with ruthenium oxide and sulfuric acid, the IR wavelength is typically about 1064 nm with a spot size about 50 µm, a power of about 50-150 mW, and a duration of about 5 msec. The UV wavelength is typically about 355 nm with a spot size of about 25 µm and energy of about 20-50 µJ/pulse. The center of the IR laser spot was located about 40 µm ahead of the UV laser spot in the direction of travel. The translation distance between laser pulses for both lasers was about 5 µm. Multiple passes can be made to fully isolate the two electrodes of the ultracapacitor. The number of passes can be about 2-5 passes.

After the dual laser micromachining procedure, the sample sits for about 1-3 minutes while the liquid electrolyte flows back into the groove from the surrounding material.

As indicated above, a unique feature of the present invention is that it allows for supercapacitors that are smaller, lighter and yet of higher power. Furthermore, the supercapacitors are processed using fewer steps and more precise methods.

In another preferred embodiment, the IR laser and UV laser are exposed to the film at about the same time. By spatially shifting the IR laser spot relative to the UV laser spot, both lasers can be passed across the film at the same time. The spatial offset provides enough time for the material to dry before the UV laser removes the material. This also enables the use of less energy with the IR laser since the material does not need to be dry as long. Depending on the spatial shift and the film material, the IR laser exposure time can be 5 msec and the energy can be 10-150 mW.

As discussed previously the process can be sensitive to the laser energies used to provide the appropriate level of dryness and machining. If the IR laser has too much power, the material may become too dry and may not refill the groove. If the IR laser has too little power, the material may become too wet to machine. If the UV laser has too much power, the machining may produce a very rough interface which in turn may lead to poor capacitor performance. If the UV laser has too little energy, the material may not be removed from the groove which may result in an electrically shorted capacitor.

This process is applicable to other metal oxide systems and is not limited to ruthenium oxide. Furthermore this process is applicable to non-reactive liquids and may be used for any materials system that can be deposited with laser direct-write or any other technique. Furthermore this process is applicable to other electrochemical systems including but not limited to batteries.

An important feature of the invention mentioned above is the single processing technique to build a complete planar electrochemical cell. The single processing step leads to quicker fabrication, better control of the electrolyte addition, smaller masses, higher energy densities, and improved cost efficiency.

Furthermore, this process enables the use of wet electrolytes such as strong acids or bases in micro electrochemical cells. The process improves the ability to package micro electrochemical cells as the amount of liquid electrolyte is minimized.

As previously discussed, the dual laser micromachining process temporarily removes water locally, yet allows for it to reflow after laser irradiation. For the complex metal oxides, the amount of structural water in the system plays an important role in the ability to store and transport charge.

Having described the invention, the following examples are given to illustrate specific applications of the invention, including the best mode now known to perform the invention. These specific examples are not intended to limit the scope of the invention described in this application.

EXAMPLES

Commercially available hydrous ruthenium oxide powder (Alfa-Aesar) was oven heated to 150° C. for 18 hours which yielded a material with water content of 0.5 mol $H_2O$ per mol $RuO_2$ for optimal charge storage. The dry powder was combined with 5 M sulfuric acid to form the ink, which was spread with a # 6 wire-coater on a borosilicate plate to form a coating approximately 5 μm thick. The $RuO_2 \cdot 0.5\ H_2O + H_2SO_4$ ink was irradiated through the back of the borosilicate plate using a frequency-tripled Nd:YAG laser (wavelength=355 nm) to induce the forward transfer of material to a substrate 100 μm below the ribbon. The substrate was a 1 cm×1 cm gold-coated quartz wafer that has been laser machined with a "window pane" structure to electrically isolate four current collector pads. Hydrous ruthenium oxide films, approximately 1 mm×2 mm×15-μm thick, were deposited across the machined groove in the gold. The hydrous ruthenium oxide films were processed using the dual laser beam processing technique to produce a symmetric planar ultracapacitor with two identical 0.5 mm×2 mm×15 μm electrodes.

Two such ultracapacitors were deposited on each substrate. White light interferometry (Zygo NewView 5022) was used to determine the actual surface morphology as well as the volume of the ultracapacitor cells, which was approximately $3 \times 10^{-5}$ mL per ultracapacitor cell. The mass of the ultracapacitors was measured on a microbalance (Sartorius M2P) where the typical mass, following deposition and micromachining, was approximately 100 μg. For this measurement the mass of the active material as well as the transferred $H_2SO_4$, was included but not included was the mass of the substrate or gold current collectors. Due to differences in the thickness of the ink coating on the glass plate from run to run, the actual values for volume and mass may vary by as much as 20% for different cells. Electrochemical evaluation of capacitance through cyclic voltammetry and chronopotentiometry was carried out using a potentiostat (EG&G PAR Model 263) connected to a probe station. Multiple chronopotentiometry steps were used to charge and discharge the ultracapacitors between 0 and 1 V in a two-electrode configuration. All cells tested for this work were charged at a constant current of 50 μA.

The chronopotentiometry of a single micro-ultracapacitor cell was demonstrated for a constant charging current of 50 μA and a discharge current of 10 μA. Linear behavior was observed during both charging and discharging cycles, thereby demonstrating the expected behavior of an ideal capacitor. Under these conditions, the average time for charging was approximately 90 s corresponding to a calculated capacitance of $C_c$=4.5 mF. The capacitance calculated from the discharge portion of the chronopotentiometry gave similar values of capacitance with discharge time of approximately 450 s corresponding to a capacity of $C_d$=4.5 mF.

Although the invention has been described above in relation to preferred embodiments thereof, it will be understood by those skilled in the art that variations and modifications can be effected in these preferred embodiments without departing from the scope and spirit of the invention.

What is claimed:

1. A method for making an electrochemical cell, said method comprising the steps of:
   providing a substrate;
   depositing a film on said substrate, wherein said film is comprised of an electrochemically active material and an electrolyte;
   exposing a portion of said film to a first laser to remove said electrolyte thereby forming first exposed portion;
   exposing said first exposed portion to a second laser to remove said electrochemically active material, wherein said removal of said electrochemically active material forms a gap in said film along said first exposed portion and thereby forms separate pads and whereby said electrolyte migrates into said gap.

2. The method of claim 1, wherein said electrolyte is liquid.

3. The method of claim 1, wherein said electrochemically active material is dry.

4. The method of claim 1 wherein said gap is through said film to said substrate.

5. The method of claim 1, wherein said substrate is comprised of a gold-coated quartz wafer.

6. The method of claim 1, wherein said substrate is comprised of electrically isolated pads.

7. The method of claim 1, wherein said film is deposited by a third laser having a wavelength of about 355 nm.

8. The method of claim 1, wherein said electrochemically active material is any electronically conductive material.

9. The method of claim 1, wherein said electrochemically active material is a transition metal oxide.

10. The method of claim 1, wherein said electrochemically active material is a hydrous transition metal oxide.

11. The method of claim 10, wherein said hydrous transition metal oxide is $RuO_x$.

12. The method of claim 1, wherein said electrochemically active material is a high surface area form of carbon.

13. The method of claim 2, wherein said liquid electrolyte is an ionically conductive liquid.

14. The method of claim 2, wherein said liquid electrolyte is an acid.

15. The method of claim 14, wherein said liquid electrolyte is sulfuric acid.

16. The method of claim 2, wherein said liquid electrolyte is a base.

17. The method of claim 1, wherein said first laser is an infrared laser with a wavelength of about 1064 nm.

18. The method of claim 1, wherein said substrate is exposed to said first laser for about 5 msec.

19. The method of claim 1, wherein said first laser and said second laser are separated by about 40 μm.

20. The method of claim 1, wherein said second laser is a pulsed ultraviolet laser with a wavelength of about 355 nm with a 30 ns pulse duration.

21. The method of claim 1, wherein said electrolyte migrates into said gap for about one to about three minutes.

22. The method of claim 1, wherein said first laser and said second laser are exposed simultaneously.

23. The method of claim 1, wherein said separate pads are electrically isolated.

24. A method for making an electrochemical cell, said method comprising the steps of:
proviving a substrate;
depositing a film on said substrate, wherein said film is comprised of a dry electrochemically active material and a liquid electrolyte;
exposing a portion of said film to a first laser to remove said liquid electrolyte thereby forming first exposed portion;
exposing said first exposed portion to a second laser to remove said dry electrochemically active material, wherein said removal of said dry electrochemically active material forms a gap through said film along said first exposed portion and thereby forms separate pads and whereby said liquid electrolyte migrates into said gap.

* * * * *